Aug. 22, 1939.  F. E. FINLAYSON  2,170,681
GLUE POT
Filed Aug. 5, 1937
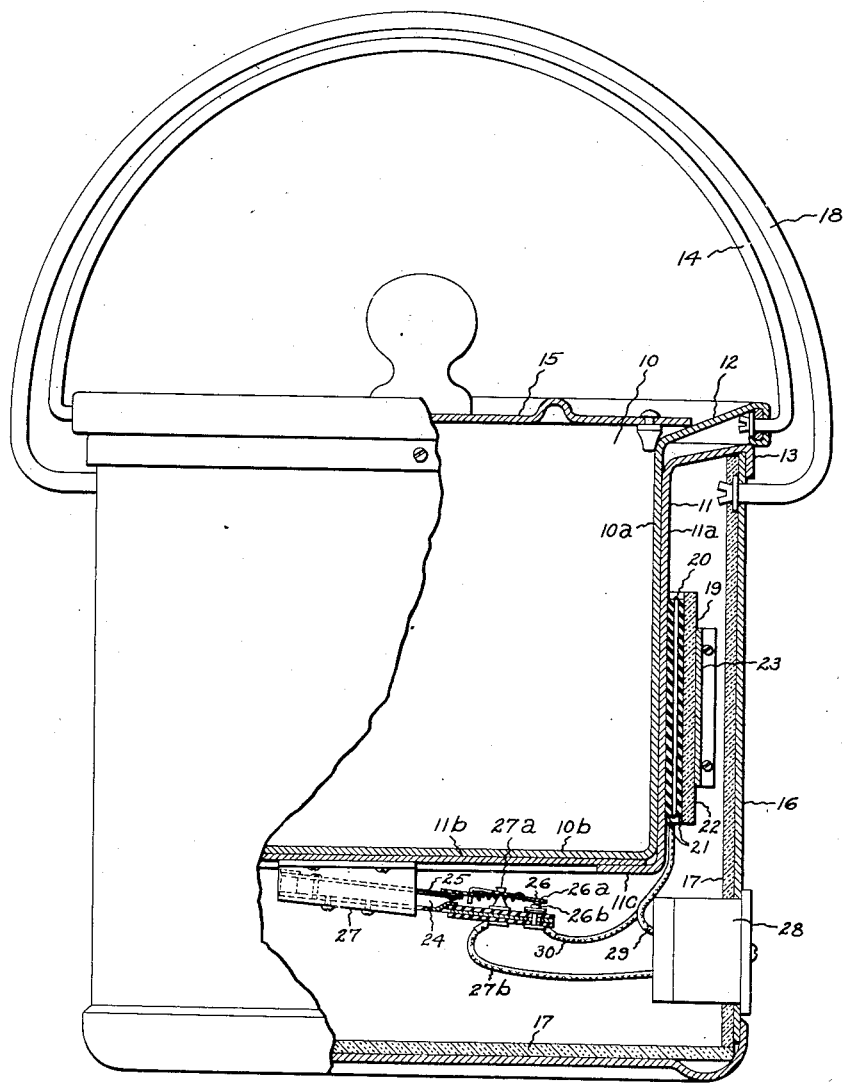
Inventor:
Frank E. Finlayson,
by Harry E. Dunham
His Attorney.

Patented Aug. 22, 1939

2,170,681

UNITED STATES PATENT OFFICE 2,170,681

GLUE POT

Frank E. Finlayson, Pittsfield, Mass., assignor to General Electric Company, a corporation of New York Application August 5, 1937, Serial No. 157,534

6 Claims. (Cl. 219—44)

This invention relates to glue pots, more particularly to electricaly heated glue pots, and it has for its object the provision of an improved device of this character.

In electrically heated glue pots there are usually two receptacles, an inner one into which the glue is placed, and an outer one into which the inner receptacle is inserted. A heating element is applied to the walls of the outer receptacle to apply heat directly thereto, and the heating element is controlled by means of a thermostat in thermal relation with the outer receptacle usually at some point remote from the wall area to which the heat is applied.

Glue pots of this character have not been entirely satisfactory because they required a considerable length of time to heat up to the desired temperature from a cold state and to regain this temperature after cooling which may be caused by stirring, dipping in a brush, or adding additional glue material.

I have found that the long delay in heating up the glue and of recovering the desired temperature after cooling is due to the fact that heat travels directly from the heated wall area to the area at which the thermostat is located and elevates the temperature of the thermostat much more rapidly than that of the glue itself. The heat travels down through the walls of the outer receptacle so rapidly that the temperature of the thermostat is elevated to the cut-off point long before the glue in the inner pot has attained a temperature even approaching it. When the thermostat has been cut off in response to this travel of the heat downwardly through the walls, it requires some time for it to cool to reenergize the heating element to again apply heat to the glue. When this occurs heat again travels down the walls to the thermostat which again prematurely cuts off the heat. This process is repeated until eventually the glue attains a temperature substantially equal to that for which the thermostat is set, but a considerable period of time has been used in the process.

In accordance with this invention in one form thereof, a heat barrier is interposed between the area of the outer receptacle to which heat is directly applied and the area where the thermostat is located. The heat barrier is so arranged that it regulates or controls the flow of heat from the heated area to the thermostatic member so that the thermostatic member heats up substantially at the same rate as does the glue, whereby the thermostat does not function to cut off the heat during substantially the entire heating up period. In other words, the glue attains the desired operating temperature in a relatively few heating steps.

For a more complete understanding of this invention, reference should be had to the accompanying drawing in which the single figure is an elevation of a glue pot embodying this invention, parts being shown in section so as to illustrate certain details of construction.

Referring to the drawing, this invention has been shown in one form as applied to an electrically heated glue pot provided with an inner receptacle 10 which receives the glue to be heated. The receptacle 10 is received by an outer receptacle 11 and has a sliding fit with it so that it may be easily withdrawn from and inserted in the receptacle 11. The receptacles 10 and 11 are provided at their upper ends with outwardly extending flanges 12 and 13 respectively. Secured to the flange 12 of the inner vessel 10 is a bail 14. The receptacle 10 is provided with a cover 15 which rests upon the flange 12 as shown.

The receptacles 10 and 11 may have any suitable shape, but preferably they will have cylindrical side walls 10a and 11a, and plane bottom walls 10b and 11b. As shown, the walls 10a and 10b of the inner receptacle are formed integrally with each other. In the case of the outer receptacle they are formed separately. The side walls 11a of this receptacle, as shown, are provided at the bottom with an inwardly extending circular flange 11c upon which the bottom wall 11b rests and to which it is secured in any suitable manner, as by soldering.

The outer receptacle 11 is supported within an outer casing 16 having substantially the same form as the two inner vessels. Lining the side and bottom walls of this casing are layers 17 formed of any suitable thermal insulating material, such as asbestos. The casing 16 is provided with a bail 18.

The glue placed within the inner receptacle 10 is heated by an electrical heating element 19 which encircles the side walls 11a of the outer receptacle 11. The heating element 19 comprises a resistance conductor 20 which is supported between a pair of insulating sheets 21 formed of any suitable electrically insulating material, such as mica. A sheet 22 formed of any suitable thermally insulating material such as asbestos encircles the outer mica sheet 21. The heating unit is secured to the outer receptacle by means of a metallic clip band 23.

Mounted on the bottom wall 11b of the outer receptacle 11 is a suitable thermostat 24 comprising a bimetallic thermostat bar 25 operating a switch 26. The bimetallic thermostat bar is mounted upon a suitable supporting bracket 27. The bar at one end is rigidly secured to the support while its other end is free to move to operate the switch 26 responsively to temperature changes in the thermostat bar. The support 27 is secured directly to the bottom wall of the outer receptacle 11 in any suitable manner as by soldering, and preferably it will be formed of any suitable material having a good heat conductivity, such as copper. The switch member 26 has roughly a triangular shape in plan, and carries at the apex a switch contact 26a which cooperates with a fixed contact 26b. The two legs of the switch member are pivoted on supporting bearings 27a (only one of which is shown). The switch contact 26a is connected through switch member 26, bearing 27a and a conductor 27b with one terminal of a suitable twin supply receptacle 28, the other terminal of which is connected with one end of the heating element 19 by means of a conductor 29. The opposite end of the heating element is connected with the fixed switch contact 26b by a conductor 30. Thus, when the switch is open the heating element 19 is deenergized and when the switch is closed the heating element is energized, providing of course that the glue pot is connected to a suitable source of electrical supply through the electrical supply receptacle 28. It will be understood that the receptacle 28 is arranged to receive any suitable supply plug of a twin conductor cord set (not shown).

The side and bottom walls 10a and 10b of the inner receptacle 10 as well as its cover 14 are formed of a good heat conducting material, such as copper. The side walls 11a of the outer receptacle 11 are formed of a similar material. The bottom wall 11b of the outer receptacle, however, is formed of a material having a relatively poor heat conductivity. In the particular glue pot shown this bottom wall is formed of a nickel-copper-zinc alloy having a relatively high resistance to the transfer of heat through it by conduction. Preferably, an alloy will be used having approximately 18% nickel, 62% copper and 20% zinc. This particular alloy has a resistance to the flow of heat approximately thirteen times as great as that of the copper of which the walls of the inner receptacle 10 and of which the side walls 11a of the outer receptacle are made.

In the operation of the glue pot, it will be understood that the glue to be heated will be placed within the receptacle 10 and that the pot will be plugged in by connecting a twin supply conductor to the plug 28. The thermostat at room temperature is closed so that under these conditions, the heating element 19 will be energized. This element when energized will apply heat to the side walls 11a of the outer receptacle 11 which in turn will transmit heat directly to the side walls 10a of the inner receptacle. These copper walls will conduct the heat from the area to which the heat is applied to all parts of the pot including the bottom wall 10b of the inner receptacle 10. Heat, however, is not transmitted directly to the thermostat 25 at the same rate, but at a considerably reduced rate, because of the insertion of the heat barrier formed by the bottom wall 11b between the thermostat and the walls to which the heat is directly applied.

The thermostat 25, however, does pick up heat directly through the bottom walls 10b and 11b from the body of glue which is being heated. In other words, while the wall 11b because of its length interposes a considerable resistance to the flow of heat directly to the thermostat from the heating element 19, it is sufficiently thin as to offer substantially no retardation to the flow of heat from the glue within the pot directly to the thermostat. When the temperature of the glue has attained the desired value, which is determined by the setting of the thermostat, the thermostat will open to deenergize the heating element. After this, the glue will begin to cool and the thermostat will cool with it until the glue has cooled to a predetermined low temperature whereupon the thermostat will function to reapply the heat. In this manner the glue is maintained at the desired temperature. It is desirable that the bottom wall 11b be so arranged and proportioned that it permits a small amount of heat to flow directly from the heating element to the thermostat. This is to prevent unduly large fluctuations in the temperature of the glue after the glue has been heated to the desired high temperature due to the temperature differential of the thermostat between the temperatures at which the thermostat opens and closes the heating circuit. The glue temperature tends to fluctuate by an amount dependent upon the magnitude of this differential. To obviate this, heat is applied directly to the thermostat from the heating element 19 to cause the thermostat to cut off the heating element at a glue temperature slightly lower than it would if the heat were not applied. In other words, the thermostat functions to maintain an even temperature in the glue.

When additional glue is added to the pot, or when instruments, such as brushes are applied to it, or the glue is stirred, it will tend to cool down. This cooling down results in a closure of the thermostat to reapply the heat to bring the glue back to the desired temperature.

An important feature of my invention is the positioning of the bottom wall 11b on the inturned lower end 11c of the outer wall 11a, as previously described, because this arrangement provides for a very intimate and direct thermal contact between the bottom wall 10b of the inner receptacle and the bottom wall 11b of the outer. These walls, therefore, and that of the copper mount 27 upon which the thermostat 25 is supported have substantially the same temperature as the glue. For all practical purposes a direct thermal contact is established between the thermostat 25 and the glue within the inner receptacle 10.

I have found that in heating up the pot, the heat will remain on until the glue attains a temperature of within ten or less degrees of the final temperature desired before the heat is cut off. On the next few operating cycles, the thermostat usually brings the pot up to the desired temperature. I have further found that there is very little difference in the operation of the device when the cover is on or off during the heating up and operating periods.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A glue pot comprising a receptacle having bottom and side walls, one of these walls having a good heat conductivity and the other a relatively poor heat conductivity, a heating element in thermal relation with the wall having good heat conductivity, a thermostat in direct heat conducting relation with the wall having the poor heat conductivity, and means controlled by said thermostat controlling said heating means to hold a substantially constant temperature in the glue.

2. A glue pot comprising a receptacle for receiving the glue provided with walls that receive and are in direct thermal relation with the glue, said walls having a relatively large area formed of a material having a good heat conductivity, and a second area formed of a material having a relatively poor heat conductivity, a heating element in direct heat conducting relation with said first area, and a thermostat in direct heat conducting relation with said second area controlling the energization of said heating element.

3. A glue pot comprising a heating receptacle having side and bottom walls, the side wall being formed of a metal having a relatively high heat conductivity and the bottom wall of a metal having a relatively poor heat conductivity, a heating element around said side wall arranged to impart heat directly to them, and a thermostat controlling the operation of said heating element mounted on said bottom wall so as to respond to its temperature.

4. A glue pot comprising an outer receptacle having a side wall that at its lower end is flanged inwardly and the wall being formed of a metal having a relatively high heat conductivity, a bottom wall on said lower flanged end formed of a metal having a relatively poor heat conductivity, means securing said bottom wall to said flanged end, an inner receptacle for the glue inserted in said outer receptacle and resting on said bottom wall, a heating element around said side wall to apply heat directly to it, a thermostat under said bottom wall controlling said heating element, and a member having a good heat conductivity on said bottom wall supporting said thermostat.

5. A glue pot comprising a receptacle having a side wall formed of copper and a bottom wall formed of a nickel-copper-zinc alloy that has a relatively poor heat conductivity, a heating element in thermal relation with said side wall and a thermostat in thermal relation with said bottom wall controlling the heating element to hold a selected temperature in said receptacle.

6. A glue pot comprising an outer receptacle having a side wall formed of copper and a bottom wall formed of an alloy having approximately 18% nickel, 62% copper and 20% zinc, an inner receptacle for the glue within the outer receptacle and formed of copper, a heating element around the side wall of the outer receptacle, a support formed of copper attached to said bottom wall, and a thermostat on said support controlling the heating element substantially in accordance with the temperature of said bottom wall.

FRANK E. FINLAYSON.